US005813757A

United States Patent [19]

Tuke

[11] Patent Number: 5,813,757

[45] Date of Patent: Sep. 29, 1998

[54] COMPACT ELECTRONIC TIMING DEVICE

[75] Inventor: Michael Antony Tuke, Surrey, United Kingdom

[73] Assignee: Finsbury (Instruments) Limited, Surrey, United Kingdom

[21] Appl. No.: 763,481

[22] Filed: Dec. 11, 1996

[30] Foreign Application Priority Data

Dec. 12, 1995 [GB] United Kingdom .................... 9525397

[51] Int. Cl.[6] ............................ B01F 15/00; G04B 47/06; G01K 1/02

[52] U.S. Cl. ............................... 366/142; 368/10; 368/11; 374/102

[58] Field of Search ..................................... 366/142, 144, 366/96, 97, 98, 99; 99/328, 468; 374/100, 102, 141; 368/10, 11, 12, 109, 327

[56] References Cited

U.S. PATENT DOCUMENTS

| | | | |
|---|---|---|---|
| 4,762,057 | 8/1988 | Hirota et al. | 366/98 |
| 4,854,716 | 8/1989 | Ziemann et al. | 366/139 |
| 5,145,250 | 9/1992 | Planck et al. | 366/8 |
| 5,531,153 | 7/1996 | Maruyama et al. | 366/98 |
| 5,584,230 | 12/1996 | Yoshida et al. | 366/98 |
| 5,590,585 | 1/1997 | Morishita | 366/98 |
| 5,628,240 | 5/1997 | Yoshida | 366/98 |

FOREIGN PATENT DOCUMENTS 0 221 759 A2 5/1987 European Pat. Off. .

*Primary Examiner*—Tony G. Soohoo
*Attorney, Agent, or Firm*—Senniger, Powers, Leavitt & Roedel

[57] ABSTRACT

The invention provides a compact electronic timing device for indicating procedural steps to be taken during the setting of a settable mixture which is to be formed by mixing two or more components in a mixing zone separated from the device. The mixture passes through a plurality of successive stages from mixing to setting, at least one stage having a duration which is temperature dependent. The device includes: a display having a plurality of portions, each portion corresponding to a stage through which the mixture is to pass; a timer having a manually operable starter; an indicator operatively linked with the timer and associated with each portion of the display for indicating the lapse of time during each stage; a temperature sensor for sensing the ambient temperature in the environment of mixing; and a controller arranged to received data from the temperature sensor and data from the timer, and arranged to provide an output, responsive to the received data, for controlling the indicator, such that the indication of the lapse of time during at least one of the stages is dependent upon the ambient temperature.

12 Claims, 1 Drawing Sheet

COMPACT ELECTRONIC TIMING DEVICE

BACKGROUND OF THE INVENTION

The present invention relates to a compact electronic timing device for indicating procedural steps to be taken during the setting of a settable mixture formed by mixing two or more components.

Examples of such settable mixtures are bone cements, dental cements, baking doughs and epoxy resins, all of which are formed by mixing two or more components.

Bone cement, or polymethyl methacrylate, is widely used in bone surgery and particularly in hip and knee operations involving replacement of whole or parts of natural joints with prosthetic implants.

A wide range of orthopedic acrylic bone cements are commercially available. The cements generally have powder and liquid components which must be mixed prior to application. The liquid components generally contain methyl methacrylate and the powder components contain polymethyl methacrylate. Additional ingredients such as stabilizers, polymerization activators, polymerization initiators, antibiotics and radiopaque agents may also be present. Thus, one commercial bone cement contains in its liquid component: methyl methacrylate; hydroquinone and ascorbic acid in small quantities to prevent premature polymerization of the methyl methacrylate; N,N-dimethyl-p-toluidine as an activator to promote polymerization when the powder and liquid components are mixed; and ethanol to enhance solubilization of the ascorbic acid. Its powder component contains: polymethyl methacrylate; benzoyl peroxide as a polymerization initiator when the powder and liquid components are mixed; and barium sulphate as a radiopaque agent.

Prior to application of the bone cement, the powder and liquid components are thoroughly mixed, typically by stirring with a dry, sterile spatula. This mixing is continued for a period of between about 45 and 75 seconds, a period which is stipulated by the manufacturer and which is necessary to initiate the polymerization reaction throughout the mixture. The period of 45–75 seconds may vary for different types of commercially available bone cement. It is referred to hereinafter as the "mixing period". Immediately after the mixing period the mixed cement may be too pourable to use and would in this case be liable to run out of any bone cavity into which it was placed. It is therefore necessary to let the cement stand for a further period which, again, is specified by the manufacturer. "This standing period" also allows for de-aeration of the cement mix and generally lasts for between about 15 and 60 seconds. If the bone cement is to be applied by syringe then, after completion of the mixing period, the cement is transferred to a cement syringe and allowed to stand for the duration of the standing period. It then has the correct viscosity characteristics to be extruded into the bone and for the prosthesis to be inserted and held in position until the cement has set.

It is vital that the cement is applied to the bone at the right time. If the surgeon leaves the cement to stand for slightly too long then he may find that, when he extrudes the cement into the bone cavity, the cement is too viscous and/or sets before it reaches the bottom of the cavity, leaving the implant stuck part-way down the cavity. Conversely, if the cement is allowed to stand for an insufficient period, it is liable to run out of the cavity. Accordingly, there is a relatively short window of time during which the cement must be used.

If the cement is to be applied by hand instead of a syringe then the mixed cement is kneaded prior to application but after the standing period. If the surgeon takes the cement in his gloved hand too soon, the mixture may stick to his gloves. After an appropriate period, the cement can be taken in a gloved hand and kneaded without unmanageable adherence to the glove. This kneading process may be continued for around 15 to 60 seconds. Also if kneading is commenced too soon, the gelled skin which tends to form on the outside of the gob of cement being kneaded will be mixed into the interior of the gob and adversely affect its properties. As with syringe injection, there is a relatively short period during which the cement may be applied into a bone cavity.

When the cement is ready for application, it is worked into the bone cavity either by hand or using a syringe. A prosthesis is then inserted into the partially filled cavity. It is important that the cement is applied and the prosthesis inserted within a fixed period, called hereafter the "application period". After expiry of this period, the cement will set too firmly to allow insertion of the prosthesis.

When the prosthesis is first inserted it is held in position for between about 6 to 8 minutes to allow the cement to set firmly around the prosthesis. If the prosthesis is released or disturbed too early it may become dislodged from its starting position thus weakening the integrity of the fixation. Thus, another important time period, i.e. the "setting period", must be considered by the surgeon.

The time periods in question vary substantially in response to slightly different ambient temperature. A warmer environment will shorten the overall period after initial mixing of the powder and liquid components during which the cement is still workable. Although manufacturers publish graphs depicting the relationship between the mixing, standing, kneading, application and setting periods and ambient temperature, the various calculations and considerations which must be made by a surgeon are complicated and time consuming and can lead to mistakes being made.

In the activity of a surgical theatre it is easily possible for mistakes to be made in the measuring of the various time periods which are important during any surgical procedure involving the use of bone cement. When the cement is mixed by hand in a bowl, the surgeon may attempt to judge the passage of the time periods in question by the feel of the cement as it is handled.

Similar considerations apply to handling of the settable mixture formed by mixing the components of an epoxy resin or by mixing the components of a dental cement or of a baking dough.

Recently, bone cement mixing devices have been introduced, thus removing the opportunity for the surgeon to judge the time periods by the feel of the cement in his hands. The use of such devices increases the criticality of the various time measurements. The device described in U.S. Pat. No. 4,854,716 comprises a mixing station with a stirrer for mixing the components of a bone cement under vacuum. The device also includes a resting station in which the mixed ingredients may be stationed for a resting period, processing period and curing period. The temperature-dependent reaction time of the polymerization reaction can be taken into account in determining the discrete time intervals by means of a temperature sensor for sensing ambient temperature. Acoustic and visual signal generating devices may also be provided to indicate the end of each time interval. Other complex mixing devices are described in U.S. Pat. No. 5,145,250, which relates to a process for the preparation of bone cement in which the mixing phase and the resting phase are under automatic control, and EP-A-0221759 which discloses an apparatus for kneading dough in which various measuring instruments are employed for displaying measured values whereby an operator can control the kneading operation according to the measured and displayed values.

SUMMARY OF THE INVENTION

According to the present invention there is provided a compact electronic timing device for indicating procedural steps to be taken during the setting of a settable mixture which is to be formed by mixing two or more components in a mixing zone separated from the device, which mixture passes through a plurality of successive stages from mixing to setting, at least one stage having a duration which is temperature dependent, the device comprising:

- a display having a plurality of portions, each portion corresponding to a stage through which the mixture is to pass;
- a timer having a manually operable starter;
- indicator means operatively linked with the timer and associated with each portion of the display for indicating the lapse of time during each stage;
- temperature sensing means for sensing the ambient temperature in the environment of mixing; and
- control means arranged to receive data from the temperature sensing means and data from the timer, and arranged to provide an output, responsive to the received data, for controlling the indicator means, such that the indication of the lapse of time during at least one of the stages is dependent upon the ambient temperature.

The device of the invention has significant advantages over the complex mixing devices hereinbefore described. The device of the invention has a display which displays portions corresponding to all of the stages to be reached by a settable mixture and indicator means associated with the display so that a surgeon can tell at a glance what stage has been reached, what proportion of the stage has elapsed, and what proportion of the stage remains. This is important because the device of the invention is intended to be used by a surgeon mixing bone cement manually, as many surgeons prefer to do. In theatre, it is easy to make mistakes both in temperature-profile calculations of bone cement processability and in monitoring time as it elapses in respect of each important, and highly time-specific, stage. The device of the invention addresses these problems faced by a surgeon mixing bone cement manually.

The device of the invention is relatively inexpensive to manufacture, compared with the prior art machines. The device of the invention is compact and may easily be carried from one operating room to another. By "compact", it is meant that the device of the invention is preferably readily hand-portable so that a surgeon can easily carry the device from one operating theatre to another. Preferably, the device is pocket-size. Because of the compact nature of the device, it is preferable for the device to comprise shielding means for shielding the temperature sensing means from heat generated by electronic components of the device. One such suitable shielding means is polyurethane foam.

In use, the device of the invention actively displays each stage of the settable mixture and also the proportion of each stage that has elapsed at any given time. This is of valuable assistance to a user of the device who is constantly informed as to the status of the settable mixture and as to procedural steps to be taken at the time.

When the device of the invention is to be used with bone cement as the settable mixture, the significant stages may comprise (i) a mixing stage, (ii) a standing stage or a kneading stage or a standing and kneading stage, (iii) an intermediate application stage, and (iv) a setting stage. During the mixing stage the components of the bone cement are mixed, typically for a period of from about 45 to about 75 seconds. When the bone cement is to be applied manually, the kneading stage will usually last for about 15 to about 60 seconds. The bone cement will remain workable for manual application during the intermediate application stage for a period which is typically from about 60 to about 90 seconds. After application the bone cement is normally held in place for the setting stage, which in a typical case lasts for about 6.5 to about 9.5 minutes.

If the bone cement is to applied by means of a syringe, then the mixture should be transferred to the syringe cartridge at the end of the mixing stage. In this case the cement should be extruded into the bone within about 2 minutes from the start of mixing, while extrusion should be completed within about 90 seconds thereafter.

The indicator means may comprise markers movable relative to the display. For example, the indicator means may comprise a plurality of lights, one or more lights being associated with each portion of the display. The lights associated with different portions of the display may be progressively switched on, or off, as the stage corresponding to the portion elapses.

The display may be a circular display. In this case, the display portions may be sectors of the circular display. Each portion of the display may each bear a different colour or pattern. If desired, each portion of the display may bear wording indicative of the stage of the settable mixture corresponding to that portion of the display, for example "MIX", "STAND", "APPLY", and "SET". The transition between the various stages corresponds to the moment at which the indication means indicates a transition between successive portions of the display.

In one preferred embodiment of the invention, the device comprises humidity sensing means, the control means being responsive to the humidity sensing means. Thus, the control means control the indicator means so as to provide indications of the lapse of time during each stage at the ambient temperature and the ambient humidity of mixing.

Preferably, the device of the invention is battery powered. This aids portability of the device.

The control means of the device conveniently comprises a microchip which receives data from the temperature sensing means and, if present, from the humidity sensing means. The microchip may be of any suitable conventional design and preferably has selectable settings corresponding to the temperature/set profiles of a variety of commercially available settable mixtures, such as bone cements. For example, the selectable settings may correspond to the effect of temperature on the handling and working characteristics of CMW1, CMW2 and CMW3 commercially available bone cements.

In one preferred embodiment of the invention, the indicator means is arranged to indicate the end of a final stage of the settable mixture after a delay period following the time at which the end of the final stage has in fact been reached. When the settable mixture is a bone cement, for example, the final stage is the setting stage, during which a surgeon must hold a prosthesis in position while the cement sets and bonds the prosthesis to an appropriate bone surface. If the surgeon releases the prosthesis too soon, this can have disastrous consequences, including dislodgement of the prosthesis. Accordingly, this preferred embodiment of the invention has the advantage that a safeguard against premature completion of the setting stage is provided. The delay period is preferably from about 30 seconds to about 5 minutes, more preferably from about 1 minute to about 3 minutes, and is even more preferably about 2 minutes.

Preferably for the indicator means comprises sound generating means for producing an audible indicium indicative of the end of a corresponding elapsed time period measured from the initiation moment. Still more preferably, sound generating means are provided for producing audible indicia periodically or continuously throughout the duration of any given stage of the settable mixture. For example, the audible indicia indicative of the beginning and/or end of the intermediate application stage may comprise a tone of fixed or warbling pitch which sounds for a few seconds, for example 2 to 10 seconds. The tone at the beginning of the intermediate application stage may be different from that at the end of the intermediate application stage. Alternatively the audible indicium indicative of the beginning and/or end of the intermediate application stage may comprise a series of short bleeps, each lasting, for example, from about 0.1 seconds to about 1 second each. It may be arranged that such bleeps increase in frequency as the beginning and/or end of the intermediate application stage approaches so as to indicate increasing urgency for action to the user.

In addition to providing an audible indicium indicative of the end of a corresponding time period measured from the initiation moment, the sound generating means is preferably adapted to produce an audible warning prior to the beginning of the intermediate application stage and also an audible warning prior to the end of the intermediate application stage. Such an audible warning is preferably a different sound from the audible indicium indicating the end of the respective time period. Hence, if the audible indicium is a continuous tone, the audible warning can comprise a plurality of short bleeps, which can be regular or increasing in frequency and/or loudness as the end of the respective time period approaches.

The sound generating means may be a buzzer or bell or the like.

It is also contemplated to provide audible indicia in the form of spoken instructions to the user produced by means of a sound synthesiser or from a sound recording.

The control means is adapted to control the indicator means automatically in response to changes in ambient temperature. The temperature sensing means may comprise a temperature probe which may be inserted in the mixing zone or into a test sample of the settable mixture. The exothermic temperature rise in the test sample of the mixture as time elapses after the initiation of mixing may conveniently serve as a marker for the stages through which the settable mixture passes. Thus, the control means may be responsive to temperature readings taken directly from the test sample of the mixture itself.

In one embodiment the control means comprises computer means arranged to receive a signal from the temperature sensing means and to control the indicator means or timer means in dependence upon the ambient or settable mixture temperature as sensed by the temperature sensing means. In this case the device may be controlled by a computer program in which temperature is treated as a variable parameter to be input as data into the computer or automatically entered into the program from a suitable temperature measuring device.

The settable mixture may alternatively be a dental cement or an epoxy resin, a baking dough or the like.

BRIEF DESCRIPTION OF THE DRAWINGS

In order that the invention may be clearly understood and fully carried into effect, a preferred embodiment thereof will now be described with reference to the accompanying drawings, in which.

DETAILED DESCRIPTION OF THE PREFERRED EMBODIMENT

Figure 1:
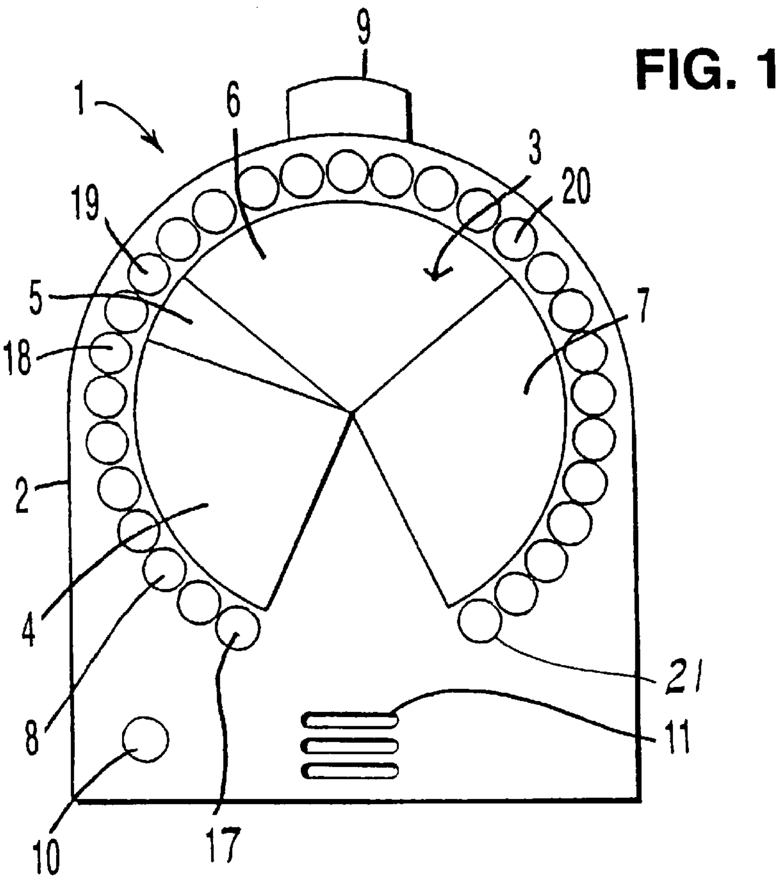
FIG. 1 shows a plan view of a device according to the invention.

Referring to FIG. 1, there is shown a device 1 which is compact, being handportable, and has a housing 2 for a number of electronic components (which are described later with reference to FIG. 2). Housing 2 is of any suitable material, such as a plastics material, and has a display 3 which is generally circular and is divided into four portions 4, 5, 6 and 7. In the device of FIG. 1, display 3 is a printed label attached to housing 2. Display 3 may alternatively comprise, for example, a liquid crystal display or a light emitting diode display.

Indicator means 8 are provided on housing 2 around the periphery of display 3. In the device of FIG. 1, indicator means 8 comprises a succession of lights which are progressively illuminated as each stage elapses.

Device 1 also comprises manually operable starter means 9 and a power socket 10. However, it is preferred that device 1 be battery powered. Reference numeral 11 indicates an outlet in housing 2 for audible indicia generated by the device.

Figure 2:
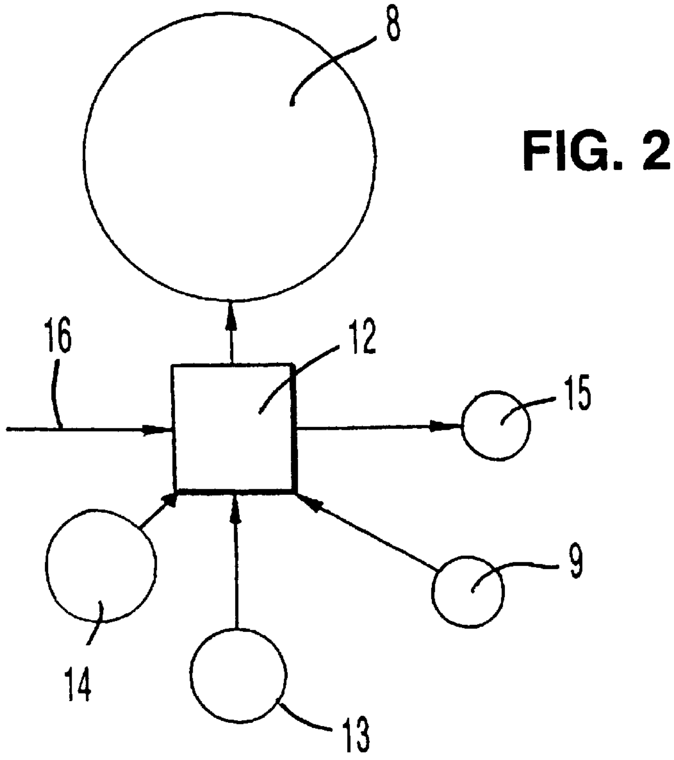
FIG. 2 shows a diagram of the electronic components of the device of FIG. 1.

Referring now to FIG. 2, device 1 comprises control means 12 in the form of a microchip. Temperature sensing information is supplied to control means 12 from temperature sensing means 13 and humidity sensing information is supplied from humidity sensing means 14. Control means 12 receives input signals from starter means 9 and outputs control signals to visual indicator means 8 and to audible indicator means 15. Reference numeral 16 indicates a power supply line to control means 12.

When device 1 is used, a surgeon initiates the timer by pressing starter 9. Preferably, starter 9 is arranged such that an extended, continuous press is needed to actuate the starter. This avoids accidental starting and restarting of the device. When control means 12 receives a start signal from starter 9, temperature sensing means 13 and humidity sensing means 14 supply a respective signal to control means 12. Control means 12 selects an output signal to indicator means 8 and the first light 17 of indicator means 8 is illuminated.

The surgeon begins mixing the bone cement whilst successive lights around the periphery of "MIX" portion 4 of display 3 become illuminated by control signals from control means 12 to indicator means 8. As each light of visual indicator means 8 becomes illuminated, an output control signal to audible indicator means 15 causes an audible beep to be generated.

When the final light 18 around the periphery of "MIX" zone 4 is illuminated, audible indicator means 15 generates a rapid series of audible beeps, serving to alert the surgeon that the mixing stage is over.

The surgeon then leaves the mixed cement to stand as successive lights are illuminated around the periphery of "STAND" portion 5. Desirably, the lights around the periphery of "STAND" zone 5 are a different color from that of the lights around the periphery of "MIX" zone 4.

If appropriate, the surgeon may also knead the cement during the "STAND" period corresponding to "STAND" portion 5 on display 3. Alternatively, a separate "KNEAD" portion may be provided on device 1.

When the final light 19 around "STAND" portion 5 is illuminated, an audible warning tone is generated by audible indicator means 15 and the surgeon is alerted to the need to begin applying the cement. Successive lights around "APPLY" portion 6 are lit as the "APPLY" stage elapses.

At the end of the "APPLY" stage, final light 20 around "APPLY" portion 6 is lit and an audible warning tone is sounded by inticator 15. The surgeon then holds the prosthesis in place for the duration of the "SET" stage. When final light 21 around "SET" portion 7 is lit, the time which has elapsed during the indicated "SET" stage is in fact somewhat longer than the true duration of the "SET" stage. This safeguards against premature completion of the "SET" stage.

What is claimed is:

1. A compact electronic timing device for indicating procedural steps to be taken during the setting of a settable bone cement mixture which is to be formed by mixing two or more components in a mixing zone separate from the device, which mixture passes through a plurality of successive stages from mixing to setting, at least one stage having a duration which is temperature dependent, the device comprising:

a display having a plurality of separate portions, each portion corresponding to a stage through which the mixture is to pass;

a timer having a manually operable starter;

indicator means operatively linked with the timer and disposed in each separate portion of the display for indicating the lapse of time during each stage;

temperature sensing means for sensing the ambient temperature in the environment of mixing; and control means arranged to receive data from the temperature sensing means and data from the timer, and arranged to provide an output, responsive to the received data, for controlling the indicator means, such that the indication of the lapse of time during at least one of the stages is dependent upon the ambient temperature.

2. A device according to claim 1, which further comprises shielding means for shielding the temperature sensing means from heat generated by the device.

3. A device according to claim 1, wherein the control means is configured to control the indicator means to indicate the end of a final stage of the settable mixture after a delay period following completion of the final stage.

4. A device according to claim 1, comprising humidity sensing means for sensing ambient humidity, the control means being responsive to the humidity sensing means to set the duration of at least one of the stages in correspondence to the ambient humidity detected.

5. A device according to claim 1, wherein the manually operable starter is configured to activate the timer only upon sustained manual engagement of a predetermined duration selected so as to avoid accidental actuation of the starter.

6. A device according to claim 1, wherein the display comprises portions respectively corresponding to the following stages of the mixture;

a) a mixing stage;

b) a standing stage;

c) an application stage; and d) a setting stage.

7. A device according to claim 6, wherein the display comprises a portion corresponding to a kneading stage of the mixture.

8. A device according to claim 1, in which the indicator means comprise markers and means for moving the markers relative to the display as each stage elapses.

9. A device according to claim 1, wherein the indicator means comprises a series of lights associated with the display, and means for progressively switching the lights on or off as each stage elapses.

10. A device according to claim 1, in which each portion of the display bears a different color, pattern or label.

11. A device according to claim 1, in which the indicator means comprises sound generating means for producing an audible indicium indicative of the end of a stage of the settable mixture.

12. A device according to claim 1, in which the indicator means comprises sound generating means for producing audible indicia during each respective stage.

* * * * *